US010301986B2

(12) United States Patent
Lapoint

(10) Patent No.: US 10,301,986 B2
(45) Date of Patent: May 28, 2019

(54) FILTRATION ASSEMBLY

(71) Applicant: Leroy P. Lapoint, Lake Arthur, LA (US)

(72) Inventor: Leroy P. Lapoint, Lake Arthur, LA (US)

(*) Notice: Subject to any disclaimer, the term of this patent is extended or adjusted under 35 U.S.C. 154(b) by 0 days.

(21) Appl. No.: 15/040,022

(22) Filed: Feb. 10, 2016

(65) Prior Publication Data

US 2016/0230623 A1    Aug. 11, 2016

Related U.S. Application Data

(60) Provisional application No. 62/114,875, filed on Feb. 11, 2015.

(51) Int. Cl.
*F01M 11/03* (2006.01)
*B01D 39/18* (2006.01)
*B01D 29/11* (2006.01)

(52) U.S. Cl.
CPC ........... *F01M 11/03* (2013.01); *B01D 29/114* (2013.01); *B01D 39/18* (2013.01); *B01D 2201/182* (2013.01)

(58) Field of Classification Search
CPC ........ B01D 25/04; B01D 25/08; B01D 25/16; B01D 25/176; B01D 25/18; B01D 25/21; B01D 25/22; B01D 29/0011; B01D 29/0045; B01D 29/018; B01D 29/055; B01D 29/46; B01D 27/144; B01D 46/40; B01D 46/406
USPC ............................................. 96/392; 166/235
See application file for complete search history.

(56) References Cited

U.S. PATENT DOCUMENTS

| 2,593,227 | A |  | 4/1952 | Wagner |
| 2,863,561 | A |  | 12/1958 | Just et al. |
| 3,387,630 | A |  | 6/1968 | Routson |
| 3,993,561 | A |  | 11/1976 | Swearingen |
| 4,093,548 | A |  | 6/1978 | Sterkenburg et al. |
| 4,120,794 | A |  | 10/1978 | Taylor |
| 4,435,287 | A |  | 3/1984 | Sumimoto |
| 4,664,814 | A |  | 5/1987 | Backman et al. |
| 5,207,930 | A |  | 5/1993 | Kannan |
| 5,690,825 | A |  | 11/1997 | Parton |

(Continued)

FOREIGN PATENT DOCUMENTS

| GB |  | 599092 | A | * | 3/1948 | ............ B01D 29/46 |
| GB |  | 1070048 | A | * | 5/1967 | ............ B01D 29/15 |
| JP | WO | 2005105261 | A1 | * | 11/2005 | ........... B01D 29/216 |

OTHER PUBLICATIONS

English translation of WO 2005105261 A1.*

*Primary Examiner* — Heidi R Kelley
*Assistant Examiner* — Eric J McCullough
(74) *Attorney, Agent, or Firm* — Ted M. Anthony

(57) ABSTRACT

A filtration assembly for removing solid particulate matter and contaminants from motor oil including, without limitation, motor oil used in internal combustion engines. A housing having a removable cap defines an inner chamber. Stacked sheets of filter materials, interspersed between pressure plates, are installed within the chamber. Pressurized fluid is introduced into the inner chamber; the fluid pressure acts on the pressure plates and compresses the filter materials. As the pressurized fluid passes through the filter materials, solids and particulate matter are filtered from the fluid stream by the filter materials.

4 Claims, 3 Drawing Sheets

(56) References Cited

U.S. PATENT DOCUMENTS

| | | | |
|---|---|---|---|
| 6,319,416 B2 | 11/2001 | Morgan et al. | |
| 6,827,851 B1 * | 12/2004 | Strohm | B01D 25/26 210/228 |
| 7,247,245 B1 | 7/2007 | Proulx et al. | |
| 2010/0065486 A1 * | 3/2010 | Assion | B01D 29/012 210/232 |
| 2010/0264100 A1 | 10/2010 | Rivera et al. | |

* cited by examiner

FILTRATION ASSEMBLY

CROSS REFERENCES TO RELATED APPLICATION

Priority of U.S. Provisional Patent Application Ser. No. 62/114,875, filed Feb. 11, 2015, Incorporated Herein by Reference, is Hereby Claimed.

STATEMENTS AS TO THE RIGHTS TO THE INVENTION MADE UNDER FEDERALLY SPONSORED RESEARCH AND DEVELOPMENT

NONE

BACKGROUND OF THE INVENTION

1. Field of the Invention

The present invention pertains to a filtration assembly for filtering contaminants, debris and particulates from a fluid stream. More particularly, the present invention pertains to a filtration assembly for cleaning fluids (including, but not limited to, motor oil) by removing contaminants, debris and particulates from said fluid.

2. Brief Description of the Prior Art

Fluid circulation systems are used in many different applications for many different purposes. Frequently, said fluid circulation systems involve the pumping of pressurized fluids through a substantially closed fluid flow circuit. Such fluid is often cleaned or reconditioned during circulation or as a separate step in the fluid circulation process.

One common fluid circulation system is an oil system of an internal combustion engine such as, for example, the motor oil system of an automobile or other vehicle. Such motor oil, which is used to cool and lubricate an engine, generally does not wear out or degrade. However, such oil can become dirty over time and collect a high concentration of many different solid contaminants or other particulates. Newer so-called "Tier 4" engines, in particular, generate a large amount of soot or other carbon material that should be beneficially removed from an engine's motor oil system.

Most motor oil systems include a filter assembly for removing solid matter contained in liquid oil. Such solids are removed by adhering to a filter medium, while liquid motor oil passes through said filter medium. Such solids can include, without limitation, dirt, debris and small metal pieces or shavings generated by an engine. As a result of such particulate content, contaminated motor oil must be changed or replaced periodically; generally, motor oil that is high in contaminants results in higher costs and more frequent automobile service operations.

Thus, there is a need for a fluid filtration cleaning system that beneficially filters and removes particulates and contaminants from motor oil or other fluids, while permitting reuse of re-circulated and cleaned motor oil over a longer period of time. Said cleaning system should lower the cost of automobile maintenance, reduce engine wear and tear, and improve overall economic performance of motor oil and the engine(s) using such motor oil.

SUMMARY OF THE INVENTION

The present invention comprises a column bypass filtration assembly for removing solid particulate matter and contaminants from motor oil including, without limitation, motor oil used in internal combustion engines. In a preferred embodiment, said filtration assembly of the present invention comprises a plurality of removable filtration assemblies that are included in-line within a motor oil system of an internal combustion engine, such as in an engine of an automobile, boat or other vehicle.

In a preferred embodiment, the present invention comprises a housing member having a substantially cylindrical shape. Said housing member has a top end, a bottom end and side walls that cooperate to define an inner chamber. Additionally, said housing member comprises at least one fluid inlet and one fluid outlet. Said fluid inlet is beneficially located at or near the top end of said housing member, while said fluid outlet is located at or near the bottom of said housing member; said inlet and outlet are ideally axially aligned with each other. Said fluid inlet and fluid outlet permit fluid (such as, for example, motor oil) to enter the filtration assembly of the present invention, flow through said filtration assembly, and then exit said filtration assembly in order to be re-circulated in the active motor oil system of an engine.

Further, said housing member comprises a removeable lid or cap that can be selectively installed and removed from said housing. A gasket member constructed of neoprene or a synthetic rubber material, or other material exhibiting desired characteristics, is positioned generally between said lid and said housing member and beneficially provides a fluid pressure seal to prevent motor oil or other fluid from leaking from the re-sealable connection between said housing and said lid.

In a preferred embodiment, the present invention comprises a filtration column disposed within the inner chamber of said housing. Said filtration column generally comprises a plurality of—typically three (3)—pressure plate members and a plurality of stacked filtration sheets (typically cellulose or paper) disposed between said pressure plate members. Each of said pressure plate members and filtration sheets comprise a substantially circular disk shape having a slightly smaller outer diameter than the inner diameter of said housing member, thereby forming an annular space or channel extending between the inner surface of said housing member and the outer surface of said filtration column.

An uppermost or "first" pressure plate member is positioned at a relatively upper location within said inner chamber of said housing member. Said uppermost or first pressure plate member has a relatively flat or planar upper surface. A substantially ring shaped protrusion having tapered edges protrudes from the bottom surface of said first pressure plate.

At least one intermediate plate member is likewise positioned within said inner chamber formed by said housing member. Each of said intermediate pressure plate members have a substantially circular shaped hole or aperture extending through the center of said plate. A substantially circular protrusion having tapered edges extends from both the top and bottom surfaces of said intermediate pressure plates; said circular protrusion generally surrounds said hole in each of said intermediate plate members.

A plurality of filtration sheets are disposed between said uppermost plate member and said intermediate plate members. Said filtration sheets can be manufactured from a cellulose or paper material, or other similar material exhibiting desired characteristics. Additionally, said filtration sheets have a substantially circular shape, wherein the outer diameter of each filtration sheet is smaller than the inner diameter of the surrounding housing member.

Said filtration sheets further have a central hole or aperture extending through the center of each filtration sheet, wherein said holes or apertures are axially aligned with the housing inlet and housing outlet, as well as the apertures extending through said intermediate compression plate members. In a preferred embodiment, said filtration sheets are vertically stacked in multiple layers, each layer comprising a plurality of individual sheets of said filtration material.

In an alternate embodiment, the filtration assembly of the present invention comprises a plurality of—typically five (5)—pressure plates and a plurality of—typically five (5)—stacked layers of filtration sheets. In an alternate embodiment, the present invention comprises more removable parts in order to accommodate a relatively larger filtration assembly size, and ultimately, a relatively larger engine size.

BRIEF DESCRIPTION OF THE DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

In a preferred embodiment, the present invention comprises a filtration assembly for use in removing solid particulates, soot, carbon and other contaminants from a fluid stream such as, for example, automobile motor oil. In a preferred embodiment, said filtration assembly of the present invention comprises a plurality of removable components that are included in-line within a circulating motor oil system of an internal combustion engine, such as for example in an automobile, boat or other vehicle.

Figure 1:
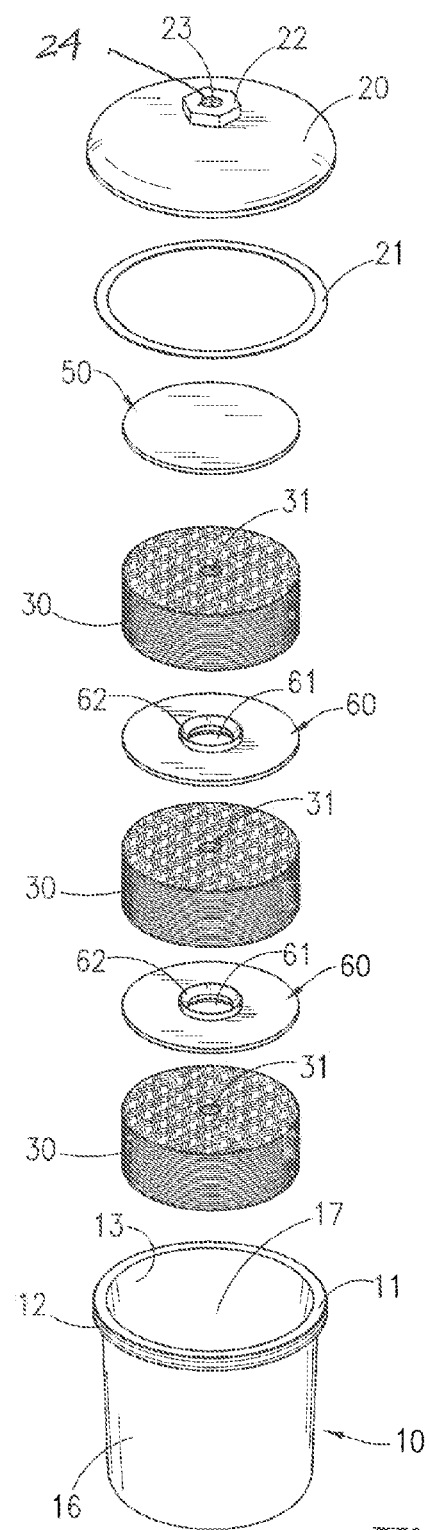
FIG. 1 depicts a perspective exploded view of a filtration assembly of the present invention.

Referring to the drawings, FIG. 1 depicts a perspective exploded view of a filtration assembly 100 of the present invention. In a preferred embodiment, filtration assembly 100 comprises a housing member 10 having a substantially cylindrical shape. Said housing member has a base (not visible in FIG. 1) and a continuous interconnected side wall 16 having an internal surface 13, extending from said base. Said base and side wall 16 cooperate to define an inner chamber 17 within said housing member 10. In a preferred embodiment, said continuous side wall 16 also defines an upper brim 11 having connection threads 12 disposed in proximity with said upper brim 11.

A removable lid or cap 20 can be removeably attached—that is, selectively installed and removed—from said housing member 10. In a preferred embodiment, said cap member 20 has a curved shape with a gentle convex outer surface and concave inner surface. Cap 20 further has connection threads (not visible on FIG. 1) that can mate with threads 12 of housing member 10 to permit secure threaded attachment of said cap member 20 to upper brim 11 of said housing member 10. Notwithstanding the foregoing, it is to be observed that other means of removeably securing cap member 20 to housing 10 can be employed without departing from the scope of the present invention.

Inlet aperture or port 23 extends through cap member 20. In a preferred embodiment, said inlet aperture 23 is positioned substantially in the center of said cap member 20. A torque profile 24 extends from said cap member and substantially surrounds said inlet aperture 23; said torque profile 24 has multiple flat surfaces (such as, for example, resembling a conventional hexagonal threaded nut) for mating with a wrench or other tool that can be used to apply torque forces to said cap member 20 to install and/or remove said cap 20 from housing 10. Internal threads 24 can be provided on the inner surface of inlet aperture 23 and/or torque profile 22 to permit attachment of a fluid inlet supply conduit (having mating threads) in a manner described below.

Gasket sealing member 21 is beneficially constructed of elastomer, rubber, neoprene or synthetic rubber material, or other similar material exhibiting desired characteristics. In a preferred embodiment, said gasket sealing member 21 has a ring shape and can be disposed generally between said cap 20 and housing member 10. When cap 20 is installed on housing 10, said seal member 21 cooperates with said cap 20 and housing 10 to provide a fluid pressure seal between said cap 20 and housing 10; said fluid pressure seal prevents pressurized fluid in chamber 17 from leaking or escaping from re-sealable connection between said housing 10 and said cap 20.

A filtration column is disposed within inner chamber 17 of said housing member 10. In a preferred embodiment, said filtration column comprises an upper compression plate 50 and a plurality of (typically two (2) or three (3)) intermediate compression plates 60. Filter material 30, beneficially arranged in separate layers, are disposed within said inner chamber 17 of housing 10. Although other materials exhibiting desired characteristics can be used, in a preferred embodiment said filter material 30 comprises a plurality of individual sheets of cellulose or paper arranged in substantially stacked relationship.

As depicted in FIG. 1, a first stack or layer of filter material 30 is received within internal chamber 17 of housing 10. An intermediate compression plate 60 is installed on the upper surface of said first stack of filter material 30. Thereafter, a second layer or stack of filter material 30 is installed above said first intermediate compression plate 60. A second intermediate compression plate 60 is installed on the upper surface of said second layer or stack of filter material 30, followed by a third layer or stack of filter material 30. Upper compression plate 50 is disposed above said uppermost stack of filter material 30. Seal member 21 is installed and cap 20 is threadedly connected to housing member 10.

Figure 2:
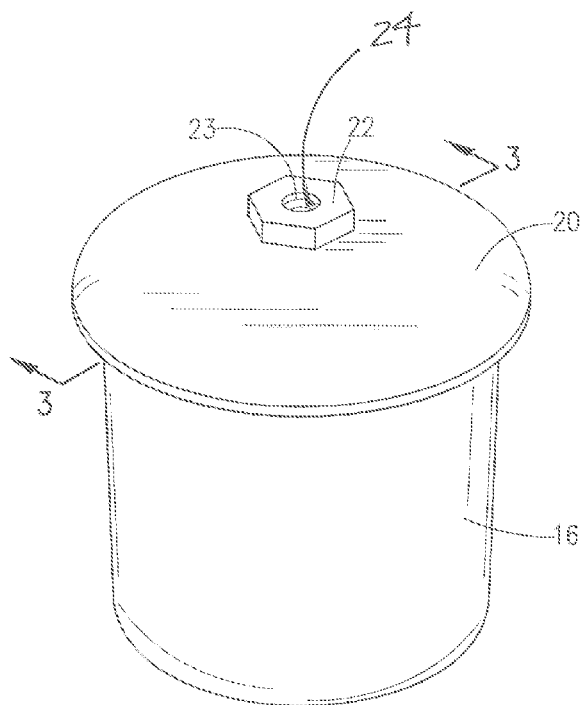
FIG. 2 depicts an overhead perspective view of a filtration assembly of the present invention.

FIG. 2 depicts an overhead perspective view of a filtration assembly 100 of the present invention. Filtration assembly 100 generally comprises a housing member 10 having a substantially cylindrical shape. Curved removable lid or cap 20 is threadedly connected to said housing member 10. Central inlet port 23 having internal threads 24 extends through said lid 20. Torque profile 23 is provided to facilitate attachment of a wrench or other tool for the connection and disconnection (that is, screwing and unscrewing) of said lid 20 to housing 10.

Figure 3:
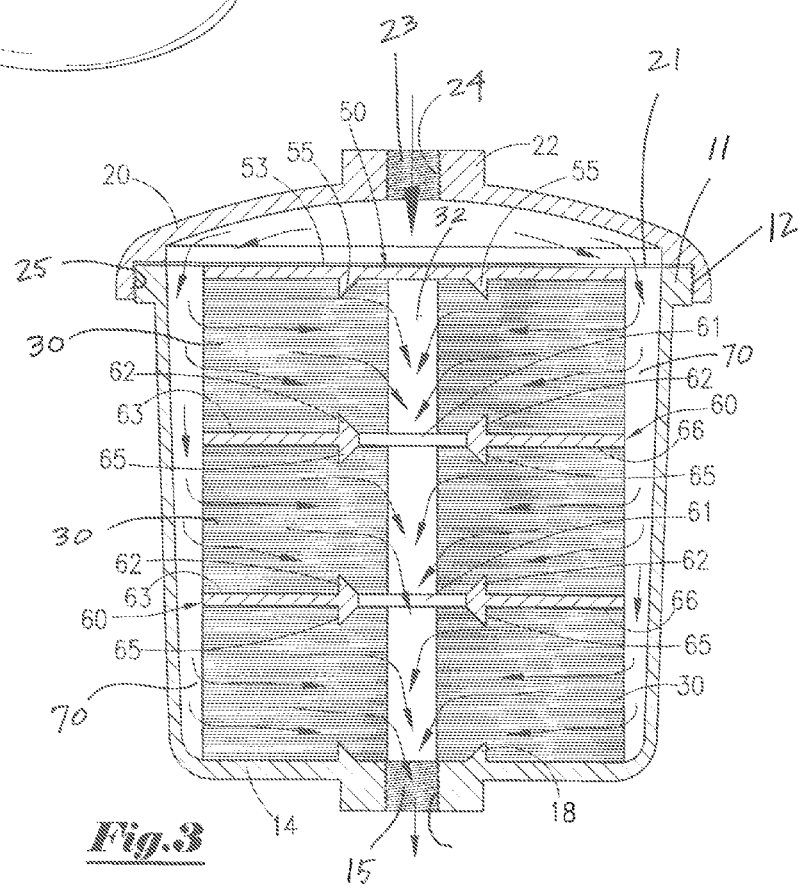
FIG. 3 depicts a side sectional view of a filtration assembly of the present invention.

FIG. 3 depicts a side sectional view of a filtration assembly 100 of the present invention along line 3-3 of FIG. 2. As depicted in FIG. 3, filtration assembly 100 comprises a housing member 10 having base 14 and a continuous side wall 16 extending from said base 14 and having an internal surface 13. Said base 14 and side wall 16 cooperate to define an inner chamber 17 within said housing member 10. In a preferred embodiment, said continuous side wall 16 also defines an upper brim 11 having connection threads 12 disposed in proximity with said upper brim 11.

Removable lid or cap 20 is selectively installed on said housing member 10. In a preferred embodiment, said cap member 20 comprises connection threads that mate with threads 12 of housing member 10 to permit secure threaded attachment of said cap member 20 to upper brim 11 of said housing member 10. Gasket sealing member 21, beneficially constructed of elastomer, rubber, neoprene, synthetic rubber material, or other similar material exhibiting desired characteristics, is disposed generally between said cap 20 and housing member 10. When cap 20 is installed on housing 10, said seal member 21 cooperates with said cap 20 and housing 10 to provide a fluid pressure seal between said cap 20 and housing 10; said fluid pressure seal contains pressurized fluid within chamber 17 and prevents such fluid from leaking or escaping from re-sealable connection between said housing 10 and said cap 20.

A filtration column is disposed within said inner chamber 17 of said housing member 10. As depicted in FIG. 3, said filtration column comprises an upper compression plate 50 and a plurality of intermediate compression plates 60 disposed there below. Sheets of filter material 30 are disposed within said inner chamber 17 of housing 10 in stacked relationship; although other configurations can be used without departing from the scope of the present invention, each layer of filter material 30 comprises a plurality of individual sheets cellulose or paper arranged in substantially stacked configuration.

Still referring to FIG. 3, a first stack of filter material 30 is installed within internal chamber 17 of housing 10 and rests on base 14 of said housing member 10. An intermediate compression plate 60 is installed on the upper surface of said first stack of filter material 30. Thereafter, a second stack of filter material 30 is installed above said first intermediate compression plate 60. A second intermediate compression plate 60 is then installed on the upper surface of said second stack of filter material 30, followed by a third stack of filter material 30. Upper compression plate 50 is disposed above said uppermost stack of filter material 30, and said seal member 21 and cap 20 are installed.

Figure 4:
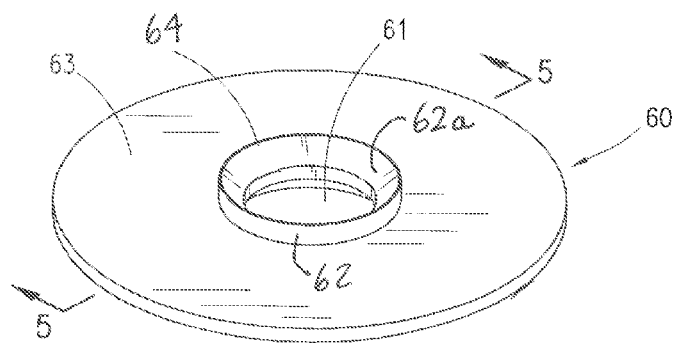
FIG. 4 depicts an overhead perspective view of an intermediate pressure plate of the present invention.

FIG. 4 depicts an overhead perspective view of an intermediate pressure plate 60 of the present invention. Said pressure plate member 60 comprises a substantially circular-shaped disc defining an outer diameter and having a central bore or aperture 61 extending there through. Pressure plate member 60 has an upper planar surface 63 and upper extension or protrusion 62 that substantially surrounds the circumference of central aperture 61. Although not depicted in FIG. 4, pressure plate member 60 also has lower planar surface 66 and lower extension or protrusion 65 that substantially surrounds the circumference of central aperture 61.

Figure 5:
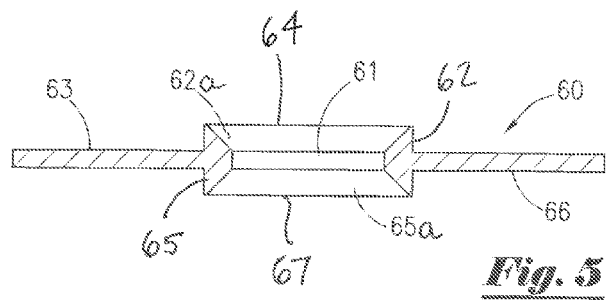
FIG. 5 depicts a side sectional view of an intermediate pressure plate of the present invention.

FIG. 5 depicts a side sectional view of an intermediate pressure plate 60 of the present invention along line 5-5 of FIG. 4. Said pressure plate member 60 comprises a substantially circular-shaped disc having a central bore or aperture 61 extending there through. Upper extension or protrusion 62 substantially surrounds the circumference of central aperture 61 while lower extension or protrusion 65 substantially surrounds the circumference of central aperture 61.

In a preferred embodiment, upper protrusion 62 has tapered inner surface 62a that defines upper narrow or pointed edge 64 at the outer extent of said upper protrusion 62. Pressure plate member 60 also has lower planar surface 66 and lower protrusion 65 that substantially surrounds the circumference of central aperture 61. Lower protrusion 65 has tapered inner surface 65a that defines lower narrow or pointed edge 67 at the outer extent of said lower protrusion 65.

Figure 6:
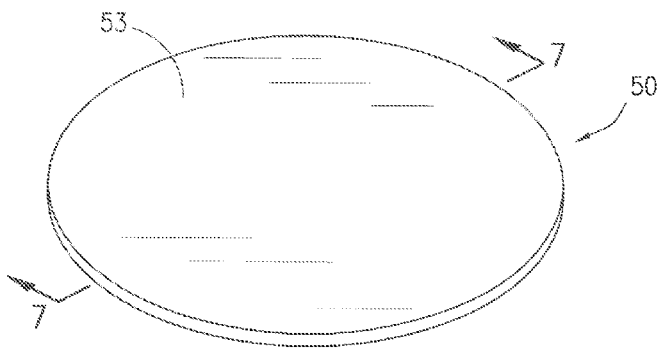
FIG. 6 depicts an overhead perspective view of an upper compression plate of the present invention.
Figure 7:
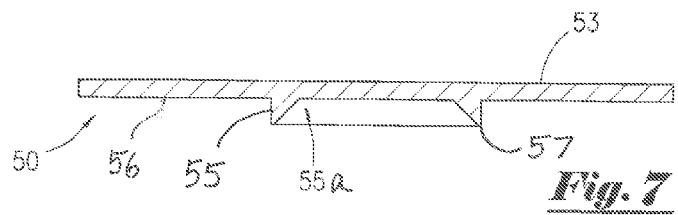
FIG. 7 depicts a side sectional view of the upper compression plate of the present invention.

FIG. 6 depicts an overhead perspective view of upper compression plate 50 of the present invention. In a preferred embodiment, said upper pressure plate member 50 comprises a substantially circular-shaped disc having substantially continuous upper planar surface 53 having no bores or apertures extending through said upper pressure plate. FIG. 7 depicts a side sectional view of upper compression plate 50 of the present invention along line 7-7 of FIG. 6. Upper pressure plate member 50 has substantially continuous upper planar surface 53 and lower planar surface 56. Pressure plate member 50 also has lower protrusion 55 extending from lower planar surface 56; lower protrusion 55 has tapered inner surface 55a that defines lower pointed edge 57 at the outer extent of said lower protrusion 55.

Referring back to FIG. 3, an upper pressure plate member 50 is positioned at a relatively upper location within said inner chamber 17 of said housing member 10. A plurality of stacked sheets of filter material 30 is disposed between said upper pressure plate member 50 and intermediate a pressure plate member 60. Similarly, a plurality of stacked sheets of filter material 30 are also disposed between said intermediate pressure plate members 60, as well as between a lowermost intermediate pressure plate member 60 and base 14 of housing member 10. Said sheets of filter material 30 can comprise filter paper, fibrous material, cellulose or other material exhibiting desired characteristics. In a preferred embodiment, said filter material 30 can comprise a plurality of stacked sheets of toilet paper such as, for example, toilet paper marketed under the brand name "Cottonelle"® by the Kimberly-Clark Corporation.

As noted above, upper pressure plate 50, intermediate pressure plates 60 and filter material 30 all have a substantially circular outer shape and can have substantially similar (or identical) outer diameter dimensions. The outer diameters of upper pressure plate 50, intermediate pressure plates 60 and filter material 30 are smaller than the inner diameter of housing member 10. As a result, a gap defining an annular space or flow channel 70 is formed between inner surface 13 of housing 10 and the outer surfaces of said upper pressure plate 50, intermediate pressure plates 60 and stacked filter material 30.

Said fluid inlet and fluid outlet permit liquid (such as, for example, motor oil) to enter into the filtration assembly 100 of the present invention, flow through said filtration assembly, and then exit said filtration assembly back into the active motor oil system of an engine. Referring back to FIG. 1 briefly, each of said stacked sheets of filter material 30 further have a central hole or aperture 31 extending through each such sheet. As depicted in FIG. 3, said holes or apertures in said sheets 30 are axially aligned with each other to form a central flow path 32.

Said flow path 32 is also axially aligned with housing inlet 23 and housing outlet 15, as well as apertures 61 extending through intermediate compression plate members 60. In a preferred embodiment, outlet port 15 can have internal threads 19 to permit connection of a fluid flow conduit to said outlet, as well as tapered extension or protrusion 18 substantially surrounding said outlet 15 and extending upward from base 14. Stacked sheets of filtration material 30 are stacked in multiple layers, each layer comprising a plurality of stacked sheets of said filter material.

In operation, motor oil is pumped or otherwise introduced into filtration assembly 100 through a supply conduit (not depicted) operationally attached to inlet port 23. Fluid pressure flowing through said inlet port 23 ultimately acts on the upper surface 53 of upper compression plate 50; such fluid pressure applies axial force to said upper compression plate 50, forcing said upper compression plate 50 generally in the direction of base 14 of housing 10.

Said axial force also acts to axially compress stacked sheets of filter material 30. Importantly, as said stacked sheets of filter material 30 compress, opposing pairs of protrusions (for example, 18 and 65, 62 and 65, and 62 and 55) are forced together, thereby "pinching" or otherwise restricting the lateral flow area through said filter material generally in the region surrounding central flow path 32. As a result, the axial compressive forces acting on said stacked sheets of filter material 30 are generally greater in the vicinity of said central flow path 32 compared to the radially outward portions of said stacked sheets of filter material (that is, in the vicinity of outer annular flow channel 70). Thus, the lateral flow openings through stacked sheets of filter material 30 are more restricted in the vicinity of central flow path 32, and relatively less restricted in the radially outward portions of annular flow channel 70.

Unable to flow through upper compression plate 50, said motor oil is diverted and flows around the radial outer edges of said upper compression plate 50 and into annular flow channel 70. As fluid pressure increases within said filtration assembly 100, said motor oil flows from said annular flow channel 70 between (or, in some cases, through) stacked sheets of filter material 30; when filtration assembly 100 is oriented in a substantially vertical orientation, said fluid flows between/through said stacked sheets of filter material 30 in a relatively horizontal direction. The oil flows through said stacked sheets of filter material 30 until said oil reaches flow path 32 (formed by axially aligned holes or apertures in said sheets 30, as well as apertures 61 extending through intermediate compression plate members 60). The oil then flows through said flow path 32, exiting filtration assembly 100 via outlet port 15. The filtrate (filtered oil) can be returned to an engine motor oil system via a fluid flow conduit operationally attached to said outlet port 15 (not shown in FIG. 3), while solid particulate matter or other filtered material remains within filter material 30.

Any fluid or liquid that passes through filtration assembly 100 of the present invention can be re-circulated through an active motor oil system and said filtration assembly 100 repeatedly. When desired (whether based on a periodic maintenance schedule or otherwise), said filtration assembly 100 can be quickly and efficiently renewed by temporarily ceasing fluid flow to said filtration assembly 100. Cap member 20 can be removed from housing 10, and upper pressure plate 50, intermediate pressure plates 60 and filter material 30 can be quickly and efficiently removed from said housing. Soiled sheets of filter material 30 (containing filtered solids, soot, carbon or other particulate matter) can be discarded.

Thereafter, upper pressure plate 50, intermediate pressure plates 60 and new sheets of stacked filter material 30 can be reloaded within said filtration assembly 100 as described above. Cap 20 can be reinstalled on housing 10, and said filtration assembly 100 can be placed back into service with minimal expense and down time. All components of said filtration assembly 100 other than soiled filter material 30 (which is inexpensive and easy to replace) can be reused.

In an alternate embodiment, the filtration assembly of the present invention comprises a plurality of—typically five (5)—pressure plates and a plurality of—typically five (5)—stacked layers of paper sheets. In an alternate embodiment, the present invention comprises more removable parts in order to accommodate a relatively larger filtration assembly size, and ultimately, a relatively larger engine size.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A method for filtering oil in a lubrication system of an engine comprising:
   a) installing at least one filtration assembly into said lubrication system, wherein said at least one filtration assembly comprises:
      i) a housing comprising:
         aa) a base having an outlet port extending through said base;
         bb) an interconnected side wall extending from said base, wherein said side wall and base cooperate to define an inner chamber; and
         cc) a pointed protrusion of singular construction extending from said base into said inner chamber and disposed substantially around the entire perimeter of said outlet port and adjacent to said outlet port;
      ii) a lid removably attachable to said housing and having an inlet port extending through said lid;
      iii) an upper compression plate movably disposed within said inner chamber, wherein said upper compression plate comprises:
         aa) a substantially planar and continuous upper surface;
         bb) a substantially planar and continuous lower surface; and
         cc) a circular pointed protrusion of singular construction extending from said lower surface;
      iv) an intermediate compression plate having a substantially planar upper surface, a substantially planar lower surface, a central aperture extending through said plate, a first pointed protrusion of singular construction extending from said upper surface and disposed substantially around the entire perimeter of said central aperture and adjacent to said central aperture, and a second pointed protrusion of singular construction extending from said lower surface and disposed substantially around the entire perimeter of said central aperture and adjacent to said central aperture, wherein said intermediate compression plate is movably disposed within said inner chamber, and wherein said central aperture of said intermediate compression plate is axially aligned with said outlet port of said base;
v) a first plurality of stacked filter sheets disposed within said inner chamber between said upper compression plate and said intermediate compression plate and defining flow openings between said stacked filter sheets, wherein each of said first plurality of stacked filter sheets has a central aperture, and wherein said central apertures of said first plurality of stacked filter sheets are axially aligned with each other, said central aperture of said intermediate compression plate and said outlet port of said base;
vi) a second plurality of stacked filter sheets disposed within said inner chamber between said intermediate compression plate and said base and defining flow openings between said stacked filter sheets, wherein each of said second plurality of stacked filter sheets has a central aperture, and wherein said central apertures of said second plurality of stacked filter sheets are axially aligned with each other, said central apertures of said first plurality of stacked filter sheets, said central aperture of said intermediate compression plate and said outlet port of said base;

wherein an annular flow channel is formed between said side wall of said housing and said upper compression plate, intermediate compression plate, and first and second pluralities of stacked filter sheets; and b) introducing motor oil into said inlet port of said filtration assembly, wherein fluid pressure of said motor oil compresses said plurality of stacked filter sheets, and wherein said upper compression plate and intermediate compression plate move within said inner chamber and compress said first and second pluralities of filter sheets, and wherein said pointed protrusion of said upper compression plate and said first pointed protrusion of said intermediate compression plate cooperate to compress said flow openings of said first plurality of stacked filter sheets more at the aligned central apertures of said first plurality of filter sheets than at said annular flow channel without penetrating said first plurality of filter sheets, and said pointed protrusion of said base and said second pointed protrusion of said intermediate compression plate cooperate to compress said flow openings of said second plurality of stacked filter sheets more at the aligned central apertures of said second plurality of filter sheets than at said annular flow channel without penetrating said second plurality of filter sheets, and said motor oil flows through said first and second pluralities of stacked filter sheets and said outlet port.

2. The method of claim 1, wherein said plurality of stacked filter sheets comprise paper or cellulose.

3. The method of claim 1, wherein said motor oil flows:
a) in said inlet port;
b) through said annular flow channel;
c) between said first and second pluralities of stacked filter sheets;
d) though said axially aligned central apertures of said pluralities of stacked filter sheets and said intermediate compression plate; and
e) out said outlet port.

4. The method of claim 1, further comprising a protrusion extending from said base of said housing, wherein said protrusion substantially surrounds said outlet port and is adjacent to said outlet port.

* * * * *